US012560216B2

(12) United States Patent
Probst et al.

(10) Patent No.: US 12,560,216 B2
(45) Date of Patent: Feb. 24, 2026

(54) GAS PRESSURE SPRING WITH OVERPRESSURE PROTECTION, METHOD FOR MANUFACTURING THE GAS PRESSURE SPRING

(71) Applicant: STABILUS GmbH, Koblenz (DE)

(72) Inventors: Ulrich Probst, Hillscheid (DE); Alexander Reiser, Münstermaifeld (DE); Felix Beib, Koblenz (DE); Nico Unkelbach, Rüscheid (DE)

(73) Assignee: STABILUS GmbH, Koblenz (DE)

( * ) Notice: Subject to any disclaimer, the term of this patent is extended or adjusted under 35 U.S.C. 154(b) by 590 days.

(21) Appl. No.: 18/108,035

(22) Filed: Feb. 10, 2023

(65) Prior Publication Data

US 2023/0258239 A1 Aug. 17, 2023

(30) Foreign Application Priority Data

Feb. 17, 2022 (DE) .......................... 102022103750.9

(51) Int. Cl.
*F16F 9/02* (2006.01)
*F16F 9/32* (2006.01)

(52) U.S. Cl.
CPC .............. *F16F 9/3235* (2013.01); *F16F 9/02* (2013.01); *F16F 2226/04* (2013.01); *F16F 2234/08* (2013.01)

(58) Field of Classification Search
CPC .......... F16F 9/0218; F16F 9/3235; F16F 9/02; F16F 2226/04; F16F 2234/08
See application file for complete search history.

(56) References Cited

U.S. PATENT DOCUMENTS

| | | | | |
|---|---|---|---|---|
| 9,683,623 | B2 * | 6/2017 | Colombo | ................... F16F 9/34 |
| 10,113,605 | B2 * | 10/2018 | Cotter | ................... F16F 9/0281 |
| 10,428,897 | B2 * | 10/2019 | Goransson | ............ F16F 9/0218 |
| 11,460,087 | B2 * | 10/2022 | Cotter | .................... F16F 9/435 |
| 2016/0298711 | A1 * | 10/2016 | Colombo | ............. F16F 9/0218 |
| 2018/0087595 | A1 * | 3/2018 | Cotter | .................... F16F 9/432 |
| 2018/0087596 | A1 * | 3/2018 | Goransson | ............. F16F 9/435 |

(Continued)

FOREIGN PATENT DOCUMENTS

| | | | | |
|---|---|---|---|---|
| DE | 24 57 938 A1 | 6/1976 | | |
| DE | 102012213169 A1 * | 1/2014 | ............ | F16F 9/3235 |
| DE | 10 2016 106 398 A1 | 10/2016 | | |

(Continued)

*Primary Examiner* — Thomas W Irvin
(74) *Attorney, Agent, or Firm* — Schmeiser, Olsen & Watts, LLP

(57) ABSTRACT

A gas pressure spring is provided including a pressure tube and a fluid with a fluid pressure enclosed by the pressure tube in a fluid-tight manner in an operating state of the gas pressure spring. A wall of the pressure tube has a local taper, the taper forming a predetermined breaking point of the wall adapted to open to release a portion of the fluid from the pressure tube in a controlled manner when the fluid pressure exceeds a limit pressure. A wall thickness of the wall has a line-shaped minimum within the taper, the wall thickness increasing monotonically from the minimum to an edge of the taper in all circumferential directions around a longitudinal axis of the pressure tube. Also provided is a method of manufacturing the gas pressure spring.

15 Claims, 4 Drawing Sheets

(56) References Cited

U.S. PATENT DOCUMENTS

| 2024/0318702 A1* | 9/2024 | Probst | F16F 9/3235 |
| 2025/0163984 A1* | 5/2025 | Probst | F16F 9/526 |

FOREIGN PATENT DOCUMENTS

| DE | 10 2020 123 636 A1 | 3/2022 |
| DE | 10 2021 124 843 A1 | 1/2023 |
| EP | 1 795 777 A2 | 6/2007 |
| JP | S49 70 384 U | 6/1974 |

* cited by examiner

GAS PRESSURE SPRING WITH OVERPRESSURE PROTECTION, METHOD FOR MANUFACTURING THE GAS PRESSURE SPRING

CROSS-REFERENCE TO RELATED APPLICATIONS

This application claims priority to German Application No. 102022103750.9, having a filing date of Feb. 17, 2022, the entire contents of which are hereby incorporated by reference.

FIELD OF TECHNOLOGY

The following relates to a gas pressure spring comprising a pressure tube and a fluid having a fluid pressure enclosed fluid-tightly by the pressure tube, a wall of the pressure tube having a local taper, the taper forming a predetermined breaking point of the wall adapted to open to release a portion of the fluid from the pressure tube in a controlled manner when the fluid pressure exceeds a limit pressure. The following also relates to a method for manufacturing the gas pressure spring according to embodiments of the invention.

BACKGROUND

A gas pressure spring is filled with a pressurised fluid. If the gas pressure spring heats up strongly, for example in the event of a fire, the pressure of the fluid can rise sharply.

To comply with the relevant transport regulations, gas pressure springs have different mechanisms to ensure safe pressure relief in the event of a fire.

Up to now, for example, a damping groove on an inner side of a jacket wall of a gas pressure spring, through which the fluid can flow past the piston of the gas pressure spring during operation of the gas pressure spring, has been designed as a predetermined breaking line at which the jacket wall is to tear open in the event of fire so that the fluid can flow out of the gas pressure spring.

However, the damping groove, which serves as a predetermined breaking line, has the following disadvantages: The damping groove extends over a large part of the length of the gas pressure spring. The position, shape and dimensions of the damping groove are fixed by its damping function and therefore cannot always be optimally adapted to the requirements of the overpressure protection. In addition, the groove embossing process (regardless of whether it is pressed or rolled) results in a work hardening of the jacket wall in this area, which influences the opening behaviour of the groove.

Other types of overpressure protection, for example overpressure valves, are associated with high manufacturing costs.

SUMMARY

An aspect relates to a gas pressure spring that can be manufactured at low cost with a reliable and safe overpressure protection and a low-cost manufacturing process for it.

The invention relates to a gas pressure spring comprising a pressure tube and a fluid enclosed fluid-tightly, in particular gas-tightly, by the pressure tube in an operating state of the gas pressure spring. The pressure tube is, for example, substantially hollow-cylindrical in shape. The pressure tube is made of steel, aluminium, plastic and/or a composite material, for example.

A working piston can be guided in the pressure tube so that it can slide along a longitudinal axis of the pressure tube. A piston rod can be attached to the working piston, which is guided out of the pressure tube along the longitudinal axis at one end of the pressure tube, for example by a guide and seal package.

The fluid is a gas, for example nitrogen. In the operating state of the gas pressure spring, the fluid pressure in an operating temperature range of the gas pressure spring is for example in a range from 50 bar to 500 bar, in particular from 100 bar to 300 bar. The operating temperature range extends, for example, from –50° C. to +200° C., in particular from –30° C. to +100° C.

A wall of the pressure tube has a localised taper, the taper forming a predetermined breaking point of the wall adapted to open to allow a portion of the fluid to be released from the pressure tube in a controlled manner when the fluid pressure exceeds a limit pressure. When the fluid pressure exceeds the limit pressure, the pressure tube bursts open at the predetermined breaking point formed by the taper, allowing a portion of the fluid to escape from the pressure tube to reduce the fluid pressure to an ambient pressure of the gas pressure spring. The predetermined breaking point thus acts as an overpressure protection.

To distinguish it from the operating state of the gas pressure spring with closed predetermined breaking point, the state of the gas pressure spring after the release of the overpressure protection with open predetermined breaking point is referred to in the following as the protection state.

The limit pressure is above, for example 50% above, a maximum fluid pressure to be expected in the operating state and in the operating temperature range and below a bursting pressure of the pressure tube without a predetermined breaking point. This prevents an undesired triggering of the overpressure protection during operation of the gas pressure spring and an uncontrolled bursting of the pressure tube in case of fire.

A wall thickness of the wall has a line-shaped, in particular a point-shaped, minimum within the taper, the wall thickness increasing monotonically from the minimum to an edge of the taper in all circumferential directions around the longitudinal axis of the pressure pipe, in particular in all directions along the wall. The "edge" is the boundary line at which the wall thickness, starting from the minimum, reaches the value of the wall thickness of the taper-free wall.

Due to this form of the taper, only a small opening is formed in the wall around the minimum when the overpressure protection is triggered. Because the wall thickness increases monotonously towards the edge of the taper, the wall does not tear open over a large area, in contrast to an elongated groove as a predetermined breaking point. The small opening allows the fluid to escape from the pressure pipe in a controlled and relatively slow manner.

A point shape is understood in the sense of the invention as a special case of a line shape, namely as a line shape with length 0. A point-shaped minimum has the advantage that the aforementioned effects are particularly pronounced. A line-shaped minimum has the advantage that it can be produced particularly easily, for example by flattening an outer side of the wall in a jacket region of the wall.

The terms "line-shaped", "point-shaped" and "monotonously increasing" are not to be understood mathematically exact in the sense of the invention. Deviations from an exact line shape or point shape or an exactly monotonous increase which are below the tolerances customary in the manufacture of gas pressure springs, for example below 0.1 mm, or in the range of a surface roughness of the pressure tube of the gas pressure spring, do not play a role in the sense of the invention.

The taper forms a recess on an outer side of the wall facing away from the fluid. It is easier to create the taper in the form of a recess on the outside than on the inside of the wall facing the fluid. Furthermore, with a recess on the outside, in contrast to a recess on the inside, there is no risk that a movement of a piston in the pressure tube or a sealing of the piston to the pressure tube is impaired. This means that the taper of the pressure tube can be positioned at any point suitable for reliable and safe overpressure protection—and not just outside a stroke path of the piston.

The taper is located in a jacket region of the wall surrounding the longitudinal axis of the pressure tube. On one end face of the pressure tube there is usually the guide and seal package through which the piston rod is guided out of the pressure tube. On the other end face there is usually a connecting element for connecting the gas pressure spring to other components. Therefore, it would be complicated to additionally attach the taper to one of the end faces. Furthermore, a recoil of fluid exiting through the jacket region acts transversely to the longitudinal axis of the pressure tube. This makes it less likely that the recoil will set the gas pressure spring in motion than if the fluid were to emerge at one of the end faces and thus cause a recoil along the longitudinal axis.

The taper forms a lenticular recess in the wall. In the case of a cylindrical lens shape, the lenticular recess causes a line-shaped minimum of the wall thickness and a wall thickness monotonically increasing along the lens curvature towards the edge of the recess. In the case of a spherical lens shape, the lenticular recess causes a punctiform minimum of the wall thickness in the centre of the recess and a wall thickness monotonically increasing towards the edge of the recess in all directions along the wall. A lenticular recess can be easily created, especially in a curved jacket region of the wall, using machining methods commonly used in the manufacture of gas pressure springs, for example by milling.

A radius of curvature of the taper is from 20 mm to 200 mm, from 50 mm to 150 mm, or 100 mm. The smaller the radius of curvature, the smaller the area of the taper and the greater the slope of the wall thickness from the minimum to the edge of the taper. A small area is advantageous for a controlled and relatively slow discharge of the fluid. However, a large slope favours uncontrolled tearing of the wall around the taper. The values mentioned have proven to be a suitable compromise for safe and reliable overpressure protection in tests, for example for a steel pressure pipe with a wall thickness of 2 mm and an outer diameter of 29 mm.

The edge of the taper is elliptical, in particular circular. An elliptical edge can be easily created, especially in a curved jacket region of the wall, with machining methods commonly used in the manufacture of gas pressure springs, for example by milling.

A large semi-axis of the elliptical edge measures from 4 mm to 40 mm, from 15 mm to 20 mm, or 17 mm. A small semi-axis of the elliptical edge measures from 1 mm to 10 mm, from 5 mm to 7 mm, or 6 mm. The above values have been shown in tests, for example for a steel pressure pipe with a wall thickness of 2 mm and an outer diameter of 29 mm, to be suitable for safe and reliable overpressure protection.

A minimum wall thickness of the wall at the minimum is from 20% to 80%, from 25% to 60%, or from 30% to 40%, of an edge wall thickness at the edge of the taper. A minimum wall thickness of the wall at the minimum is from 0.4 mm to 1.6 mm, from 0.5 mm to 1.2 mm, or from 0.6 mm to 0.8 mm. The values mentioned have been proven in tests, for example for a steel pressure pipe with an edge wall thickness of 2.0 mm, to be suitable for safe and reliable overpressure protection.

The gas pressure spring comprises a guide tube arranged coaxially to the pressure tube in the pressure tube, the pressure tube forming a projection over the guide tube along the longitudinal axis of the pressure tube. The gas pressure spring comprises a separating piston displaceable in the pressure tube along the longitudinal axis, wherein the separating piston separates a working chamber in the guide tube, an annular chamber radially to the longitudinal axis between the guide tube and the pressure tube and a support chamber in the projection from each other in a fluid-tight manner in the operating state of the gas pressure spring. The annular chamber is filled with a compensating medium that presses the separating piston in the operating state with a compensating pressure in a direction that enlarges the working chamber. In the operating state, the support chamber is filled with a supporting fluid, in particular with a support gas, which presses the separating piston with a supporting pressure in a direction which makes the working chamber smaller. In the operating state, the working chamber is filled with a working fluid, in particular with a working gas, at a working pressure.

In the design of the gas pressure spring according to the previous paragraph, the compensating medium displaces the separating piston when the gas pressure spring is heated so that the working chamber gets larger. This reduces an increase in the working pressure caused by the heating, so that a temperature dependence of a spring force of the gas pressure spring is reduced. The principle of such a temperature-compensated gas pressure spring is known, for example, from the publications EP 1 795 777 A2, DE 10 2020 123 636 A1 and DE 10 2021 124 843 A1.

The guide tube is designed, for example, like the working cylinder described in DE 10 2021 124 843 Al. The separating piston is designed, for example, like the compensating piston described in DE 10 2021 124 843 A1.

The design of the gas pressure spring as a temperature-compensated gas pressure spring creates the additional problem that in the event of a fire, the working pressure of the working fluid, the compensating pressure of the compensating medium and the supporting pressure of the supporting fluid must be safely and reliably relieved.

The additional problem is solved by the predetermined breaking point of the wall formed by the taper being designed to open to release part of the compensating medium, the working fluid, and the supporting fluid from the pressure tube in a controlled manner when the compensating pressure, the working pressure or the supporting pressure exceeds a limit pressure.

The taper of the wall adjoins the support chamber, wherein the separating piston can be moved into a securing position, in which the working chamber and the annular chamber are connected to the predetermined breaking point in a fluid-conducting manner, when the predetermined breaking point is open. This arrangement has the advantage that in case of fire, the supporting fluid can first flow out of the pressure pipe through the predetermined breaking point. Due to the reduced supporting pressure, the compensating medium and the working fluid can then move the separating piston past the predetermined breaking point into the support chamber. This allows the working fluid and the compensating medium to exit the pressure tube through the predetermined breaking point, too.

The taper of the wall is located outside a stroke path over which the separating piston can be displaced along the longitudinal axis in the operating state of the gas pressure spring. This ensures that the separating piston is not in a position in which the compensating medium is in contact with the predetermined breaking point when the predetermined breaking point opens. In this case, part of the compensating medium would first escape from the pressure tube at high pressure before the supporting pressure displaces the separating piston so that the supporting fluid can escape. Since the compensating medium, in contrast to the supporting fluid, is usually liquid, the risk of property damage or injury is higher if the liquid compensating medium first escapes at high pressure and then the gaseous supporting fluid escapes at lower pressure than vice versa.

Embodiments of the invention relate to a method for manufacturing the gas pressure spring according to the invention. In embodiments, the method comprises providing the pressure tube of the gas pressure spring, the wall of the pressure tube having a homogeneous wall thickness, and creating the taper of the wall of the pressure tube, by a material removal from an outer side and/or from an inner side of the wall. Due to the advantages mentioned above, the material removal takes place from the outer side of the wall.

The material is removed by machining, by drilling, by milling, by grinding, by turning and/or by shaping and/or by ablation, and/or by laser ablation.

Milling, shaping and laser ablation have the particular advantage that the wall is only slightly heated by them, so that heat-related changes in the material properties of the wall, which could lead to uncontrolled behaviour of the predetermined breaking point in the event of a fire, are avoided.

The material removal can create a defined contour of a recess in the wall of the pressure pipe, for example a contour with a rounded edge and/or with a rounded bottom, to facilitate painting of the pressure pipe. The contour can be defined, for example, by a shape of a cutting tool used for the material removal, e.g., by the shape of a drill or a milling head.

The provision of the pressure tube and the creation of the taper are carried out in a common process step, for example by a shaping and/or additive manufacturing process of the pressure tube with the taper. The shaping and/or additive manufacturing process comprises in particular a die casting of the pressure tube, for example from aluminium, an injection moulding of the pressure tube, for example from a plastic, and/or a 3D printing of the pressure tube.

BRIEF DESCRIPTION

Some of the embodiments will be described in detail, with references to the following Figures, wherein like designations denote like members, wherein.

Figure 1:
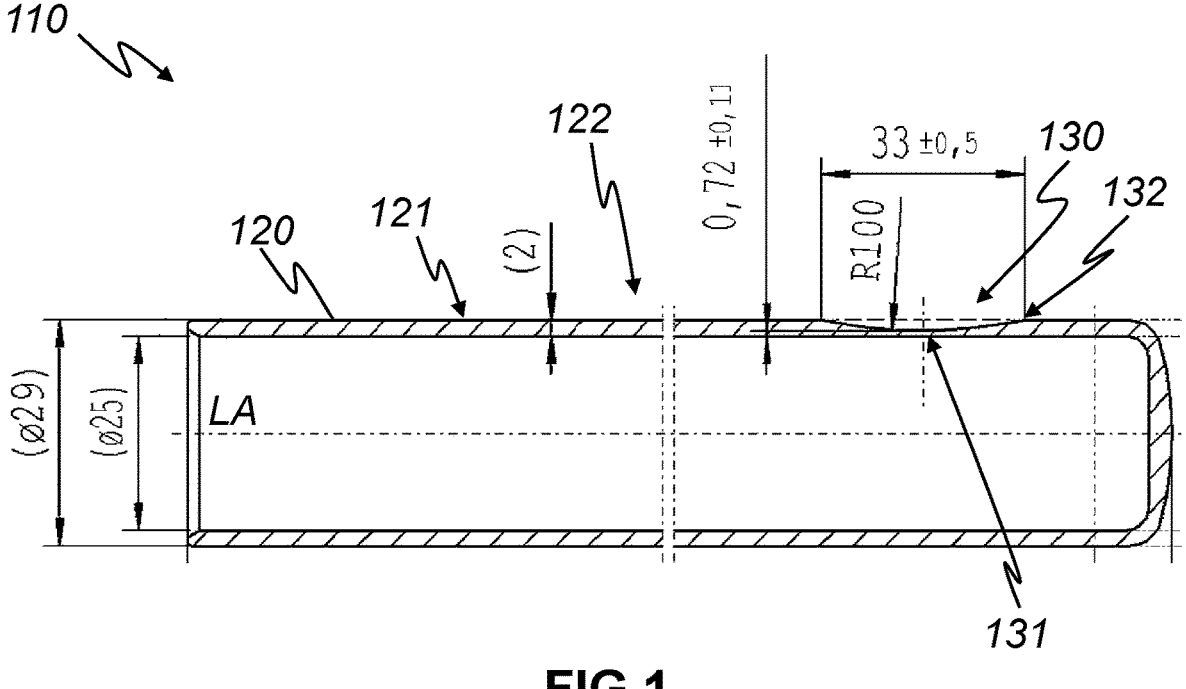
FIG. 1 shows a schematic longitudinal section through the pressure tube of a gas pressure spring according to embodiments of the invention.

FIG. 1 shows a schematic longitudinal section through the pressure tube 110 of a gas pressure spring 100 according to an embodiment of the invention along the longitudinal axis LA of the pressure tube 110, which is made of steel and is essentially hollow cylindrical in shape, for example. The pressure tube 110 has, for example, an inner diameter of 25 mm, an outer diameter of 29 mm and a wall thickness of 2 mm.

In one operating state of the gas pressure spring 100, the pressure tube 110 fluid-tightly encloses a fluid (not shown) having a fluid pressure.

A wall 120 of the pressure tube 110 shown has a local taper 130, the taper 130 forming a predetermined breaking point of the wall 120 adapted to open to release a portion of the fluid from the pressure tube 110 in a controlled manner when the fluid pressure exceeds a limit pressure.

A wall thickness of the wall 120 has a point-shaped minimum 131 within the taper 130, the wall thickness increasing monotonically from the minimum 131 to an edge 132 of the taper 130 in all directions along the wall 120.

The taper 130 shown forms a recess on an outer side 121 of the wall 120 facing away from the fluid, and is located in a jacket region 122 of the wall 120 surrounding the longitudinal axis LA.

The taper 130 shown forms a lenticular recess in the wall 120, wherein a radius of curvature of the recess is, for example, 100 mm.

For example, a minimum wall thickness of the wall 120 at the minimum 131 is 0.7 mm.

Figure 2:
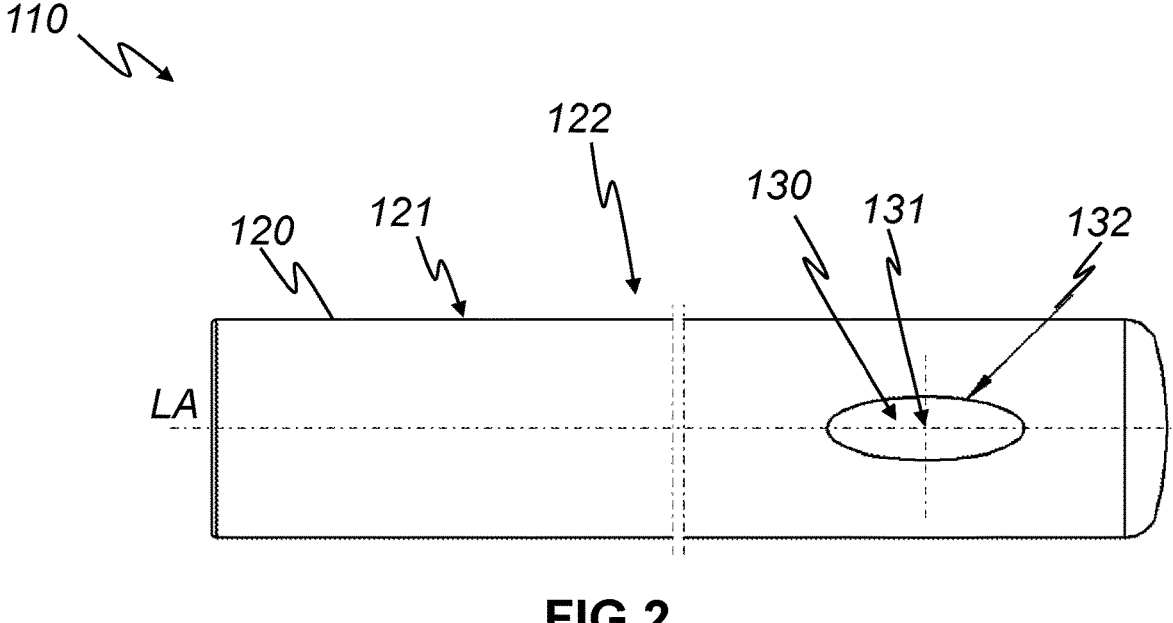
FIG. 2 shows a schematic view of the pressure tube from FIG. 1.

FIG. 2 shows a schematic view of the pressure tube from FIG. 1.

It can be seen in FIG. 2 that the edge (132) of the taper (130) shown is elliptical in shape, with a major semi-axis of the elliptical edge (132) measuring, for example, 17 mm.

Figure 3:
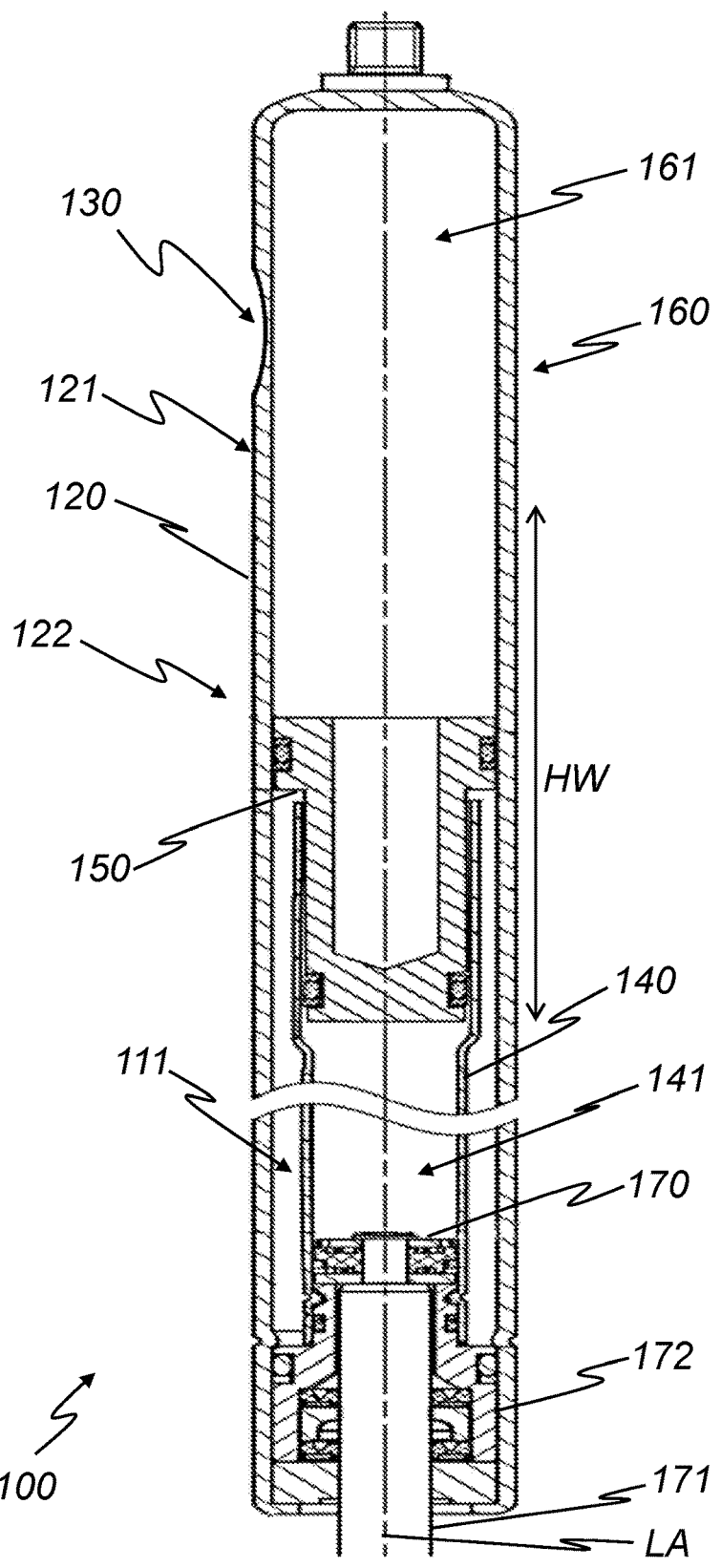
FIG. 3 shows a schematic longitudinal section through a gas pressure spring according to embodiments of the invention in the operating state.

FIG. 3 shows a schematic longitudinal section through a gas pressure spring 100 according to an embodiment of the invention along the longitudinal axis LA of the pressure tube 110 in the operating state. The pressure tube 110 can be designed in the same way as the pressure tube 110 shown in FIG. 1 and FIG. 2.

The gas pressure spring 100 shown in FIG. 3 comprises a guide tube 140 arranged coaxially to the pressure tube 110 within the pressure tube 110, the pressure tube 110 forming a projection 160 over the guide tube 140 along the longitudinal axis LA of the pressure tube 110.

The gas pressure spring 100 shown comprises a separating piston 150 displaceable in the pressure tube 110 along the longitudinal axis LA, wherein the separating piston 150 separates a working chamber 141 in the guide tube 140, an annular chamber 111 radially to the longitudinal axis LA between the guide tube 140 and the pressure tube 110 and a support chamber 161 in the projection 160 from each other in a fluid-tight manner in the operating state of the gas pressure spring 100.

The guide tube 140 is designed, for example, like the working cylinder 1 described in DE 10 2021 124 843 A1, and the separating piston 150 is designed, for example, like the compensating piston 10 described in DE 10 2021 124 843 A1.

The annular chamber 111 shown is filled with a compensating fluid (not shown) pressing the separating piston 150 with a compensating pressure in a direction enlarging the working chamber 141 in the operating state. In the operating state, the support chamber 161 is filled with a supporting fluid (not shown) that presses the separating piston 150 with a supporting pressure in a direction that makes the working chamber 141 smaller. In the operating state, the working chamber 141 is filled with a working fluid (not shown) with a working pressure.

The predetermined breaking point of the wall 120 formed by the taper 130 is designed to open in order to release a part of the compensating medium, the working fluid and the supporting fluid from the pressure tube 110 in a controlled manner when the supporting pressure exceeds a limit pressure.

The taper 130 of the wall 120 shown is adjacent to the support chamber 161 and is located outside a stroke path HW over which the separating piston 150 is displaceable along the longitudinal axis LA in the operating state of the gas pressure spring 100.

The taper 130 shown forms a recess on an outer side 121 of the wall 120 facing away from the fluid, and is located in a jacket region 122 of the wall 120 surrounding the longitudinal axis LA.

A working piston 170 is slidably guided along the longitudinal axis LA in the guide cylinder 140. A piston rod 171 is attached to the working piston 170, which is guided out of the pressure tube 110 along the longitudinal axis LA by a guide and seal package 172 at one end of the pressure tube 110. The working piston 170, the piston rod 171 and the guide and seal package 172 can be designed as in known gas pressure springs.

Figure 4:
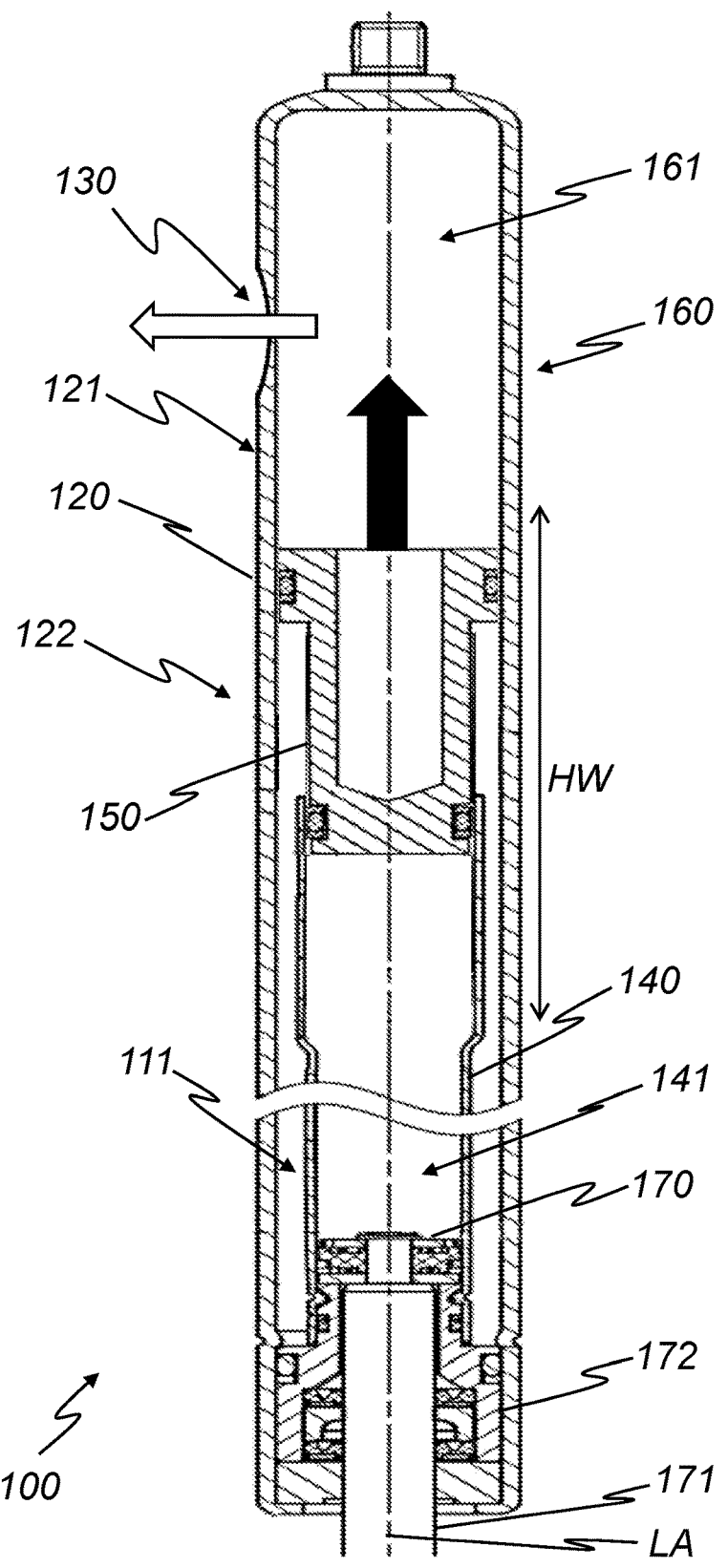
FIG. 4 shows a schematic longitudinal section through the gas pressure spring from FIG. 2 at a release time of the overpressure protection.

FIG. 4 shows a schematic longitudinal section through the gas pressure spring 100 from FIG. 2 along the longitudinal axis LA of the pressure tube 110 at a release time of the overpressure protection. At the release time, the supporting pressure exceeds the limit pressure so that the predetermined breaking point formed by the taper 130 opens.

This allows the supporting fluid to flow out of the pressure tube 110 through the opened predetermined breaking point (white arrow). Because the supporting pressure is then reduced, the separating piston 150 is displaced by the compensating medium and the working medium beyond its stroke path HW into the support chamber 161 (black arrow).

Figure 5:
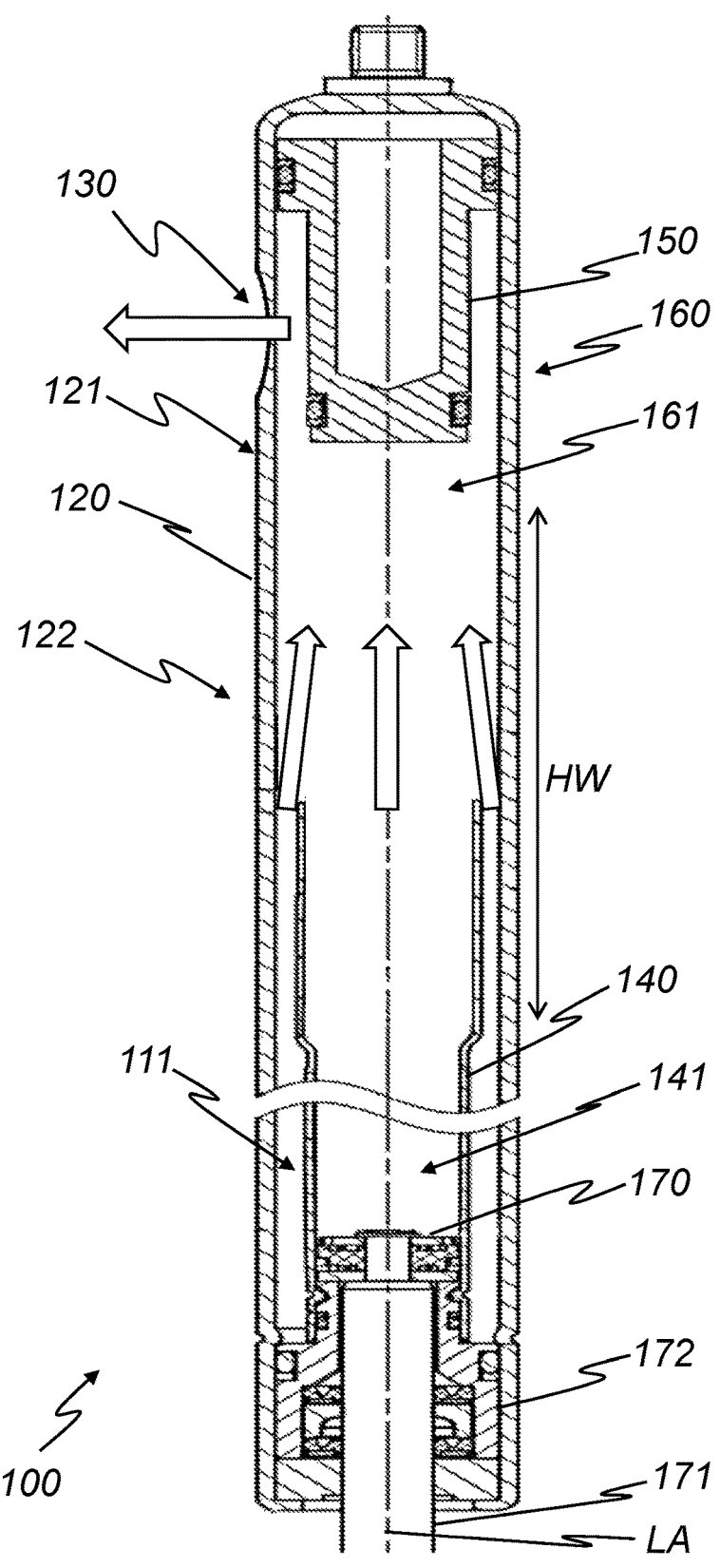
FIG. 5 shows a schematic longitudinal section through the gas pressure spring from FIG. 2 after the release time of the overpressure protection.

FIG. 5 shows a schematic longitudinal section through the gas pressure spring 100 of FIG. 2 along the longitudinal axis LA of the pressure tube 110 after the release time of the overpressure protection.

In FIG. 5, the separating piston 150 is pushed by the compensating medium and the working medium to a safety position in which the working chamber 141 and the annular chamber 111 are connected to the predetermined breaking point in a fluid-conducting manner. Therefore, the working fluid and the compensating medium can flow through the support chamber to the predetermined breaking point and out of the pressure tube 110 through the opened predetermined breaking point (white arrows).

Although the invention has been illustrated and described in greater detail with reference to the exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

LIST OF REFERENCE SIGNS

100 Gas pressure spring
110 Pressure tube

111 Annular chamber
120 Wall
121 Outer side
122 Jacket region
130 Taper
131 Minimum
132 Edge
140 Guide tube
141 Working chamber
150 Separating piston
160 Projection
161 Supporting chamber
170 Working piston
171 Piston rod
172 Guide and seal package
HW stroke path
LA Longitudinal axis

The invention claimed is:

1. A gas pressure spring comprising:
   a. a pressure tube;
   b. a guide tube arranged coaxially to the pressure tube in the pressure tube;
   c. wherein the pressure tube forms a projection over the guide tube along the longitudinal axis of the pressure tube;
   d. wherein the gas pressure spring comprises a separation piston displaceable in the pressure tube along the longitudinal axis;
   e. wherein the separating piston fluid-tightly separates a working chamber in the guide tube, an annular chamber radially to the longitudinal axis between the guide tube and the pressure tube and a support chamber in the projection in an operating state of the gas pressure spring;
   f. wherein the annular chamber is filled with a compensating medium pressing the separating piston in the operating state with a compensating pressure in a direction enlarging the working chamber;
   g. wherein the support chamber is filled in the operating state with a supporting fluid pressing the separating piston with a supporting pressure in a direction making the working chamber smaller;
   h. wherein the working chamber is filled with a working fluid having a working pressure in the operating state;
   i. wherein a wall of the pressure tube has a local taper adjacent to the support chamber;
   j. wherein the taper forms a predetermined breaking point of the wall configured to open to release a portion of the compensating fluid, the working fluid and the supporting fluid from the pressure tube in a controlled manner when the supporting pressure exceeds a limit pressure;
   k. wherein a wall thickness of the wall within the taper has a line-shaped minimum;
   l. wherein the wall thickness increases monotonically from the minimum to an edge of the taper in all circumferential directions about a longitudinal axis of the pressure pipe; and
   m. wherein, when the predetermined breaking point is open, the separating piston is displaceable into a securing position in which the working chamber and the annular chamber are connected to the predetermined breaking point in a fluid-conducting manner.

2. The gas pressure spring according to claim 1, wherein
   a. the line-shaped minimum of the wall thickness of the wall is punctiform; and b. wherein the wall thickness monotonically increases from the minimum to an edge of the taper in all directions along the wall.

3. The gas pressure spring according to claim 1, wherein the taper forms a recess on an outer side of the wall facing away from the fluid.

4. The gas pressure spring according to claim 1, wherein the taper is in a jacket region of the wall surrounding the longitudinal axis.

5. The gas pressure spring according to claim 1, wherein the taper forms a lenticular recess in the wall.

6. The gas pressure spring according to claim 5, wherein a radius of curvature of the recess is from 20 mm to 200 mm.

7. The gas pressure spring according to claim 1, wherein the edge of the taper is elliptically shaped.

8. The gas pressure spring according to claim 7, wherein
a. a major semi-axis of the elliptical edge measures from 4 mm to 40 mm; and/or
b. a small semi-axis of the elliptical edge measures from 1 mm to 10 mm.

9. The gas pressure spring according to claim 1, wherein
a. a minimum wall thickness of the wall at the minimum is from 20% to 80% of an edge wall thickness at the edge of the taper; and/or b. a minimum wall thickness of the wall at the minimum is from 0.4 mm to 1.6 mm.

10. The gas pressure spring according to claim 1, wherein the taper of the wall is located outside a stroke path over which the separating piston is displaceable along the longitudinal axis in the operating state of the gas pressure spring.

11. A method of manufacturing the gas pressure spring according to claim 1, comprising:
a. providing the pressure tube of the gas pressure spring,
b. creating the taper of the wall of the pressure pipe.

12. The method according to claim 11, wherein the creation of the taper of the wall is performed by a material removal from the wall.

13. The method according to claim 12, wherein the creation of the taper of the wall is performed by a material removal from an outer side of the wall.

14. The method according to claim 12, wherein the material removal is carried out by machining and/or ablation.

15. The method according to claim 11, wherein providing the pressure tube and creating the taper are performed in a common process step by a shaping and/or an additive manufacturing process of the pressure tube with the taper.

* * * * *